United States Patent [19]
Baker

[11] Patent Number: 5,586,123
[45] Date of Patent: Dec. 17, 1996

[54] INTERFACE AND LOOPBACK CIRCUIT FOR CHARACTER BASED COMPUTER PERIPHERAL DEVICES

[75] Inventor: Thomas H. Baker, Ft. Collins, Colo.

[73] Assignee: Hewlett-Packard Co, Palo Alto, Calif.

[21] Appl. No.: 317,440

[22] Filed: Oct. 4, 1994

[51] Int. Cl.⁶ .................................................. G06F 11/00
[52] U.S. Cl. ........................................ 371/20.5; 371/20.1
[58] Field of Search ................................. 371/20.5, 20.6, 371/20.4, 20.1, 61, 62; 395/550

[56] References Cited

U.S. PATENT DOCUMENTS

| | | | |
|---|---|---|---|
| 5,265,089 | 11/1993 | Yonehara | 370/15 |
| 5,289,474 | 2/1994 | Purcell et al. | 371/20.5 |
| 5,442,776 | 8/1995 | Masleid et al. | 395/550 |
| 5,448,588 | 9/1995 | Saito | 375/224 |

OTHER PUBLICATIONS

*IBM Technical Manual,* "Keyboard ans Auxiliary Device Controller", IBM Corp. 1990.
*Micro Cornucopia,* Issue 52, Mar.–Apr. 1990, p. 40.

*Primary Examiner*—Robert W. Beausoliel, Jr.
*Assistant Examiner*—Phung My Chung

[57] ABSTRACT

An interface circuit for keyboards and other serial peripheral devices that adds loopback capability through multiplexers in the clock and data lines, and also provides a receiver clock delayed from the transmitter clock to avoid race conditions between the data and clock lines. The circuit also provides a means of forcing a zero bit onto the data line after a byte is sent, to indicate to the transmitter that the byte was received by the receiver. The circuit also provides a way to hold off the transmitter, to simulate the normal keyboard action of holding off transmitter while it processes the character just sent.

12 Claims, 6 Drawing Sheets

INTERFACE AND LOOPBACK CIRCUIT FOR CHARACTER BASED COMPUTER PERIPHERAL DEVICES

FIELD OF THE INVENTION

This invention relates to computer systems and more particularly to peripheral device interface circuits within such computer systems. Even more particularly, the invention relates to a serial interface circuit having a loopback test circuit within a computer system.

BACKGROUND OF THE INVENTION

Although viewed primarily as an input device, the keyboard attached to personal computers, starting with the IBM Personal Computer AT and later models, is both an input and an output device. For example, the keyboards typically have "Num Lock", "Caps Lock", and "Scroll Lock" indicators that can be set or reset from the computer system, and in some models, the keys can be reprogrammed. Thus data is sent in both directions through the keyboard interface.

The keyboard interface is a serial interface having two signal lines, keyboard clock and keyboard data, as well as power and ground signals. The keyboard clock and keyboard data signals are open collector signals pulled high through a resistor. When the keyboard wants to send data to the computer system, it first checks the keyboard clock and the keyboard data signals, and if both these signals are high, the keyboard is allowed to send data. To send data, the keyboard puts a start bit on the data line. The start bit is a zero, which pulls the keyboard data line down, and then the keyboard pulls the keyboard clock line down to transfer the start bit to the computer. The keyboard then raises the clock signal, places bit zero on the data line, and pulls the keyboard clock line down again to send bit zero to the computer system. This process is repeated for each of the other seven bits of data, a parity bit and a stop bit, which is always a one. The keyboard leaves the stop bit on the data line, which allows the data signal line to stay high.

The keyboard also checks the clock bit between each data bit, to determine if the computer system is holding the clock bit low to ask the keyboard to stop sending data. The computer system is only allowed to pull the clock down during sending of the first ten bits.

When the computer wants to send data to the keyboard, it first verifies that the clock and data lines are high, and then it places the start bit on the data line, which pulls down the data line. When the keyboard detects the data line down, the keyboard cycles the clock line ten times to transfer the data from the computer system to the keyboard. Only ten clock cycles are required, since the start bit was already on the data line. Thus, the keyboard is always in control of the keyboard clock line, except that the computer system may hold the clock line down to stop a transmission from the keyboard to the computer system.

Normally the clock signal makes transitions only when data is being transferred, and it only makes as many transitions as necessary to transfer a character. The protocol specifies that the computer system transmitter will change its data on the negative edge of the clock, and that the computer system receiver will accept data on the negative edge of the clock. Normally the keyboard, or other external device using this protocol, will perform the complementary action on the positive edge of the clock. That is, the external device changes its data on the positive edge of the clock, and accepts data on the positive edge.

This creates a limitation for loopback testing, however, since the protocol builds in a race condition for any loopback of data. Because the computer system transmitter must change data on the same clock edge that the computer system receiver clocks data into its circuit, the loopback data may be incorrect. Loopback testing is important for diagnosing defects during manufacturing of the circuit and also for diagnosing defects should the circuit fail in use.

Prior art versions of the keyboard interface typically use an embedded microprocessor to control the interface, or they use a Universal Synchronous/Asynchronous Receiver Transmitter (USART) to send data over the interface. For example, in Micro Cornucopia, Issue 52, March–April 1990, p. 40, a keyboard interface circuit is shown that uses an 8251 USART. Because USARTs were designed to work with the RS/232 serial interface commonly used with modems, they send and receive data on different signal lines, thus loopback testing is easily accomplished. Also, many USARTs have an internal loopback test capability.

Another prior art circuit, published in the IBM technical manual for the PC AT, uses a 74LS322 shift register for serial to parallel and parallel to serial conversion. This circuit, however, does not include a loopback test capability.

There is need in the art for an interface circuit using the standard keyboard protocol that includes loopback capability. There is another need in the art for such a circuit that avoids race conditions between the data and clock signals. A still further need is for such a circuit that uses simple shift registers while still providing loopback capability. The present invention meets these and other needs in the art.

SUMMARY OF THE INVENTION

It is an aspect of the present invention to provide an interface circuit for computer peripheral devices that use a serial interface.

It is another aspect of the invention to provide such an interface circuit having loopback capabilities.

Still another aspect of the invention is to provide such an interface wherein the loopback circuit allows the other circuits of the interface to operate identically in loopback as well as normal operation.

A further aspect of the invention is to provide a loopback circuit that avoids race conditions between the clock and data signals within the interface.

The above and other aspects of the invention are accomplished in a serial interface circuit for communicating with keyboard devices, pointer devices such as a mouse, 3-D mouse devices, knob boxes, program ID modules, etc., that adds loopback capability through multiplexers in the clock and data lines, and also provides a receiver clock delayed from the transmitter clock to avoid race conditions between the data and clock lines.

The circuit uses a loopback control circuit having a state machine, a counter, and a delay circuit to control the interface during loopback operations. The state machine controls the operation, while the counter is used to count the number of bits being transmitted, and the delay circuit provides a delay between the transmit clock and the receive clock to avoid a race condition. An alternative, preferred, embodiment eliminates the delay and counter circuits, using the state machine to perform these functions.

The circuit also provides a means of forcing a zero bit onto the data line after a byte is sent, to indicate to the transmitter that the byte was received by the receiver. The circuit also provides a way to hold off the transmitter, to simulate the normal keyboard action of holding off transmitter while it processes the character just sent.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
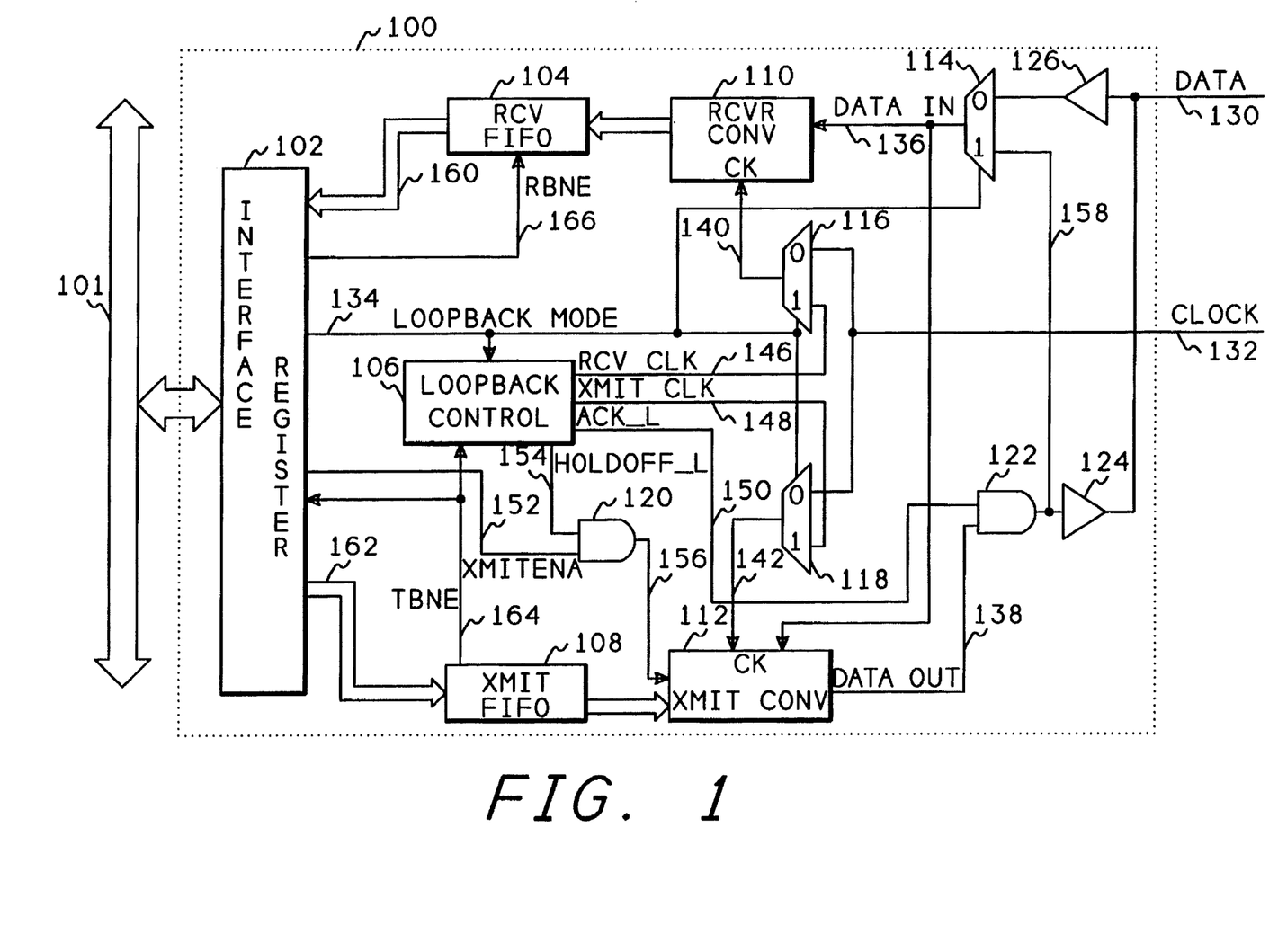
FIG. 1 shows a block diagram of the peripheral interface circuit of the present invention, including a loopback circuit.

FIG. 1 shows a block diagram of the external device serial interface of the present invention. Referring now to FIG. 1, an interface circuit 100 contains interface registers 102 that are connected to a system bus 101. The system bus 101 is the computer system bus used by the computer system processor to communicate to peripheral devices. The interface registers, described below with respect to FIG. 2, have read and write data registers for sending and receiving data from the serial device, as well as control and status registers.

Data sent by the computer system is placed into the interface registers and transferred to the XMIT FIFO 108, which holds one byte. If the transmitter is enabled, the byte from the XMIT FIFO 108 is transferred to the XMIT CONV circuit 112, where it is converted from parallel to serial data, and start, stop and parity bits are added, creating an 11 bit byte for transmitting to the external device. The serial data output by the XMIT CONV circuit is sent over a DATA OUT signal 138, through an AND circuit 122, through a buffer 124 and placed on the DATA signal line 130. The serial data is clocked out of the XMIT CONV circuit 112 by a CLOCK signal line 132. The CLOCK signal line 132 is controlled by the external device, and connected to the XMIT CONV circuit 112 through a multiplexer 118. Control of the XMIT CONV circuit is not shown in FIG. 1, since the circuit is conventionally constructed to conform to the standard keyboard protocol described in the background section above. That is, the circuit examines the clock and data lines and if both are high, the circuit loads data from the XMIT FIFO 108 to the XMIT CONV circuit 112, and places the start bit on the DATA OUT signal line 138 and thus on the DATA signal line 130. When the external device detects the low level signal on the DATA signal line 130, the external device cycles the CLOCK signal 132 to transfer the data. After the data has been received by the external device, the external device pulls the DATA signal line 130 low to indicate that the data was received. This is detected by the XMIT CONV circuit 112, which allows the transmitter to send another byte of data if one is available in the XMIT FIFO 108.

Receive DATA signal line 130 is connected though a buffer circuit 126 and through a multiplexer 114 to the DATA IN signal line 136 of the RCVR CONV circuit 110. The RCVR CONV circuit 110 converts the serial data to parallel data. The parallel data is placed in a RCV FIFO 104, which holds four bytes, and then through the interface registers 102 where it can be transferred over the system bus 101 into the computer system processor (not shown). Receive data is also clocked into the RCVR CONV circuit 110 by the CLOCK signal 132 through a multiplexer 116.

The loopback circuit allows the transmit and receive circuits to be tested without changing the normal way they operate. That is, the signal lines external to the circuits are changed, for example with the multiplexers 114, 116, and 118, but the actual transmit and receive circuits are not altered when the loopback mode is activated.

When the loopback mode is activated, the loopback mode signal 134 is set to a value of one, which changes the signal that is gated through multiplexers 114, 116, and 118, thus changing the source of the clock signal that is input to the RCVR CONV circuit 110, and the source of the clock signal that is input to the XMIT CONV circuit 112. When in loopback mode, the loopback control circuit 106 supplies the RCV CLK signal 146, the XMIT CLK signal 148, and two other signals ACK_L signal 150 and HOLDOFF_L signal 154. The purpose of the ACT_L and HOLDOFF_L signals will be described below with respect to FIG. 4.

Figure 2:
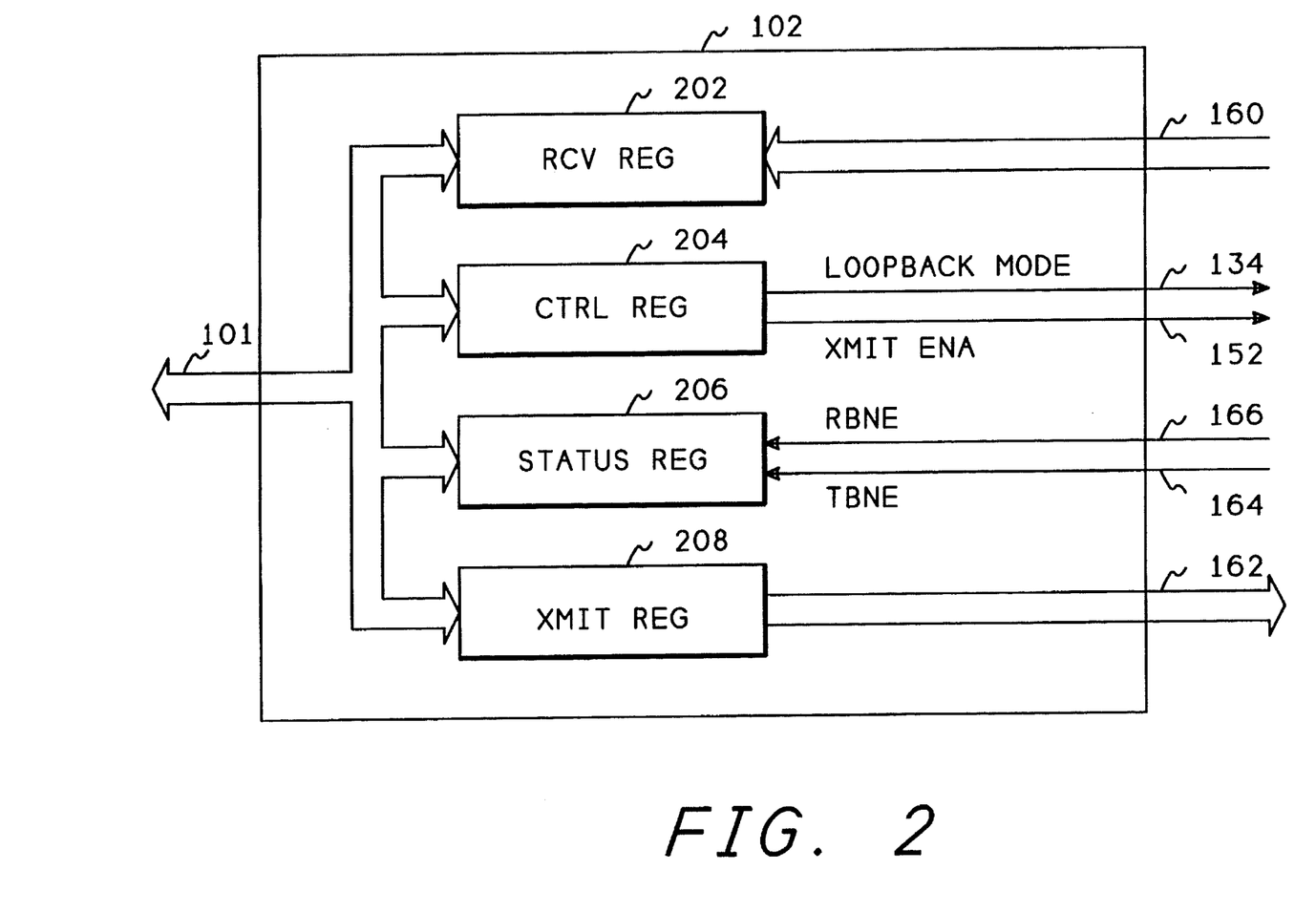
FIG. 2 shows a block diagram of the interface registers block of FIG. 1.

FIG. 2 shows a block diagram of the INTERFACE REGISTERS circuit 102 of FIG. 1. Referring now to FIG. 2, the system bus 101 connects to four registers, a receive data register RCV REG 202, a control register CTRL REG 104, a STATUS REG 206, and a transmit data register XMIT REG 208 to transfer data between these registers and the computer system processor (not shown). The RCV REG 202 receives a unit of data, typically a byte, from the RCVR FIFO circuit 104 (FIG. 1)over bus 160, and transfers the unit to the system bus 101. Similarly, the XMIT REG 208 receives a unit of data from the system bus, and transfers this data over bus 162 to the XMIT FIFO circuit 108 (FIG. 1).

CTRL REG 204 receives data from the system bus 101 that contains control information to control the operation of the interface circuit 100. Specifically, two bits of the CTRL REG 204 are used in the present invention. Other bits, not relevant to the invention, may also be contained within the CTRL REG 204. The LOOPBACK MODE bit of the CTRL REG 204 is connected to the LOOPBACK MODE signal line 134, such that when the LOOPBACK MODE bit is set to one in the CTRL REG 204, the LOOPBACK MODE signal line is active, that is, set to a value of one. Similarly, the TRANSMIT ENABLE bit of the CTRL REG 204 controls the XMIT ENA, transmit enable, signal line 152. When active, the TRANSMIT ENABLE bit allows the transmitter side of the interface to function, and when inactive, no data can be sent to the external device.

STATUS REG 206 contains two bits that tell the computer system processor whether the receiver FIFO is not empty, that is the receiver FIFO contains at least one byte of data, or whether the transmitter FIFO is not empty. These bits are copies of the RBNE signal line 166 and the TBNE signal line 164, respectively.

Figure 3:
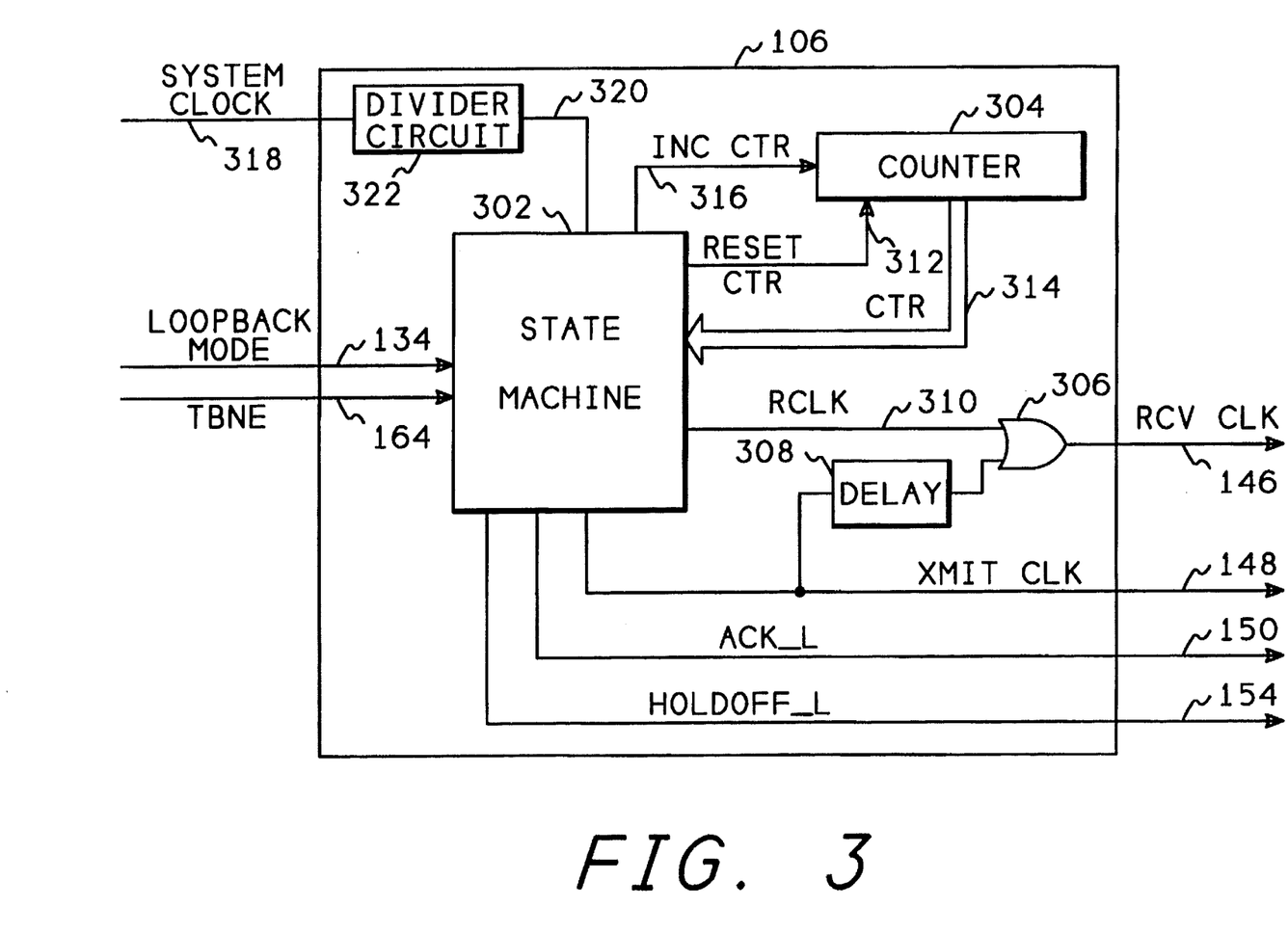
FIG. 3 shows a block diagram of the loopback control circuit of FIG. 1.

FIG. 3 shows a block diagram of the LOOPBACK CONTROL circuit 106 of FIG. 1. Referring to FIG. 3, the LOOPBACK CONTROL circuit 106 contains a STATE MACHINE 302, that controls the operation of the LOOP- BACK CONTROL circuit. The STATE MACHINE 302 will be described below with respect to FIG. 4. The STATE MACHINE 302 is clocked by a clock signal 320 which is derived by dividing the system clock 318 by a fixed value, typically 16, with a divider circuit 322. Although not required, dividing the system clock allows the state machine to run at a lower frequency than the clock frequency of the entire circuit to reduce radio frequency interference (RFI) that might occur through the keyboard connector. Although the keyboard is not used in loopback mode, the signals are still connected to the keyboard connector, and the high clock frequency of the circuit could cause unwanted RFI through the keyboard connector.

A COUNTER circuit 304 is used by the STATE MACHINE 302 to count the number of bits sent from the transmitter to the receiver in loopback mode. CTR signal 314 provides the value contained in the counter to the STATE MACHINE 302, INC CTR signal 316 allows the STATE MACHINE 302 to increment the COUNTER 304, and RESET CTR signal 312 allows the STATE MACHINE 302 to reset the COUNTER 304 to a value of zero.

The RCLK signal 310 is output by the STATE MACHINE 302 to send a RCV CLK signal 146 to the RCVR CONV circuit 110. The XMIT CLK signal 148 is output by the STATE MACHINE 302, to send the XMIT CLK signal to the XMIT CONV circuit 112 (FIG. 1). In addition, the XMIT CLK signal is connected to a DELAY circuit 308, which delays the XMIT CLK signal to provide the REC CLK signal 146. Therefore, each time the STATE MACHINE 302 outputs an XMIT CLK signal 148, the RCV CLK signal 146 follows a short time thereafter, typically half the period of signal 320, which is sufficiently long for data on the DATA OUT signal 138 to propagate through the circuits and be set up to be clocked into the RCVR CONV circuit 110. This delayed REC CLK signal prevents race conditions between the data output by the XMIT CONV circuit 112 and the RCV CLK signal 146, since the data output by the XMIT CONV circuit 112 may change on the negative edge of the XMIT CLK signal 148, and the RCVR CONV circuit 110 also clocks in data on the negative edge of the RCV CLK signal 146.

Figure 4:
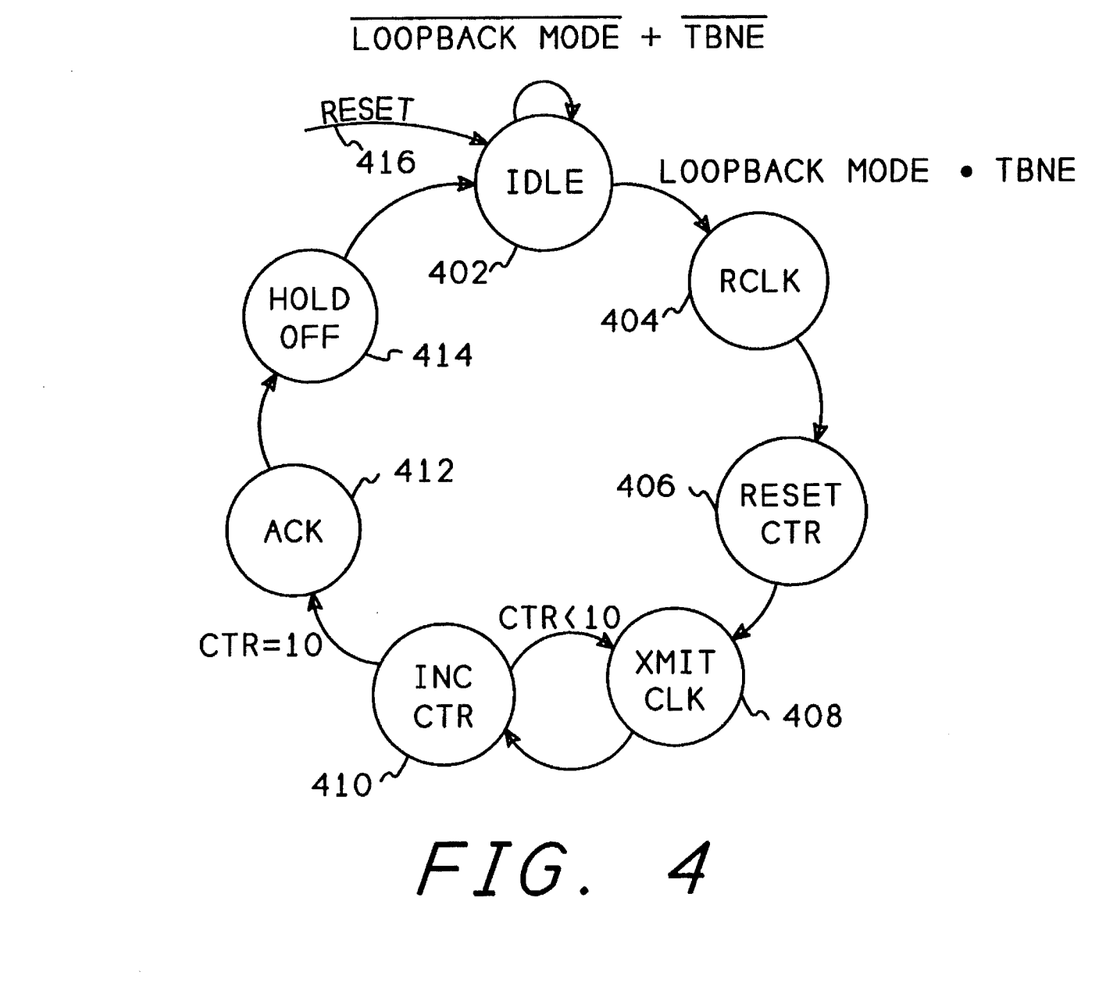
FIG. 4 shows a state machine diagram for the state machine of FIG. 3.

FIG. 4 shows a state diagram of the STATE MACHINE 302 of FIG. 3. This state machine is only used when the interface is placed in loopback mode by setting the LOOPBACK MODE bit in the CTRL REG 204 (FIG. 2). Referring now to FIG. 4, the state machine normally waits in the IDLE state 402 as long as either the LOOPBACK MODE bit is inactive or the Transmitter Buffer Not Empty (TBNE) signal is inactive. That is, the loopback circuit only works after the LOOPBACK MODE bit is set, and there is a byte of data in the XMIT FIFO to be sent to the receiver. Also, as shown by reset line 416, if a reset occurs in any state, the state machine will return to the idle state.

Once the LOOPBACK MODE bit is set, as indicated by LOOPBACK MODE signal 134, and a byte of data is stored in the XMIT FIFO 108 causing the TBNE signal to be set, the state machine moves to RCLK state 404, which outputs the RCLK signal 310 (FIG. 3), to send a RCV CLK signal 146 to the RCVR CONV circuit 110. The RCV CLK signal will indicate to the RCVR CONV circuit 110 that a start bit is present on the DATA IN signal 136. The start bit will be present on the DATA IN signal 136 at this time because the TBNE signal 164 caused the byte of data in the XMIT FIFO to be loaded into the XMIT CONV circuit 112, and the XMIT CONV circuit placed the start bit on the DATA OUT signal 138, which is connected to the DATA IN signal 136 through circuit 122 and the multiplexer 114.

After RCLK state 404 sends the RCV CLK signal 146, the state machine goes to RESET CTR state 406 which sends the RESET CTR signal 312 to reset the COUNTER 304. Then XMIT CLK state 408 sends the XMIT CLK signal 148, which after a delay, also sends the RCV CLK signal 146, to clock the next data bit output by the XMIT CONV circuit 112 into the RCVR CONV circuit 110. INC CTR state 410 then sends the INC CTR signal 316 to increment the COUNTER 304. While the value in the COUNTER 304, as indicated by the CTR signal 314, is less than 10, the state machine will transfer back to state 408 to send the next bit, thus sending all data bits, the parity bit, and the stop bit to the RCVR CONV circuit 110.

Once the COUNTER reaches 10, all bits of the byte have been sent so the state machine goes to the ACK state 412 to send the ACK_L signal 150. This signal causes signal 158 to be pulled low, thus indicating to the XMIT CONV circuit 110 that the last data bit has been received. The normal signal level on the ACK_L signal is high, thus allowing all data from the DATA OUT signal to pass through AND circuit 122, but in the ACK_L state 412, the ACK_L signal is set to a low value, degating AND circuit 122 and causing signal 158 to go low. Pulling the DATA IN signal low is the same method used by the external device to indicate that a byte of data has been received by the external device, thus the loopback circuit works in the same manner as the external device.

The external device will not allow the transmitter to send another byte until it has processed the current byte. This is indicated to the transmitter by the external device holding the data line low until the external device is ready to receive another byte. This means that the XMIT CONV circuit needs an extra time between sending bytes of data. The loopback circuit inserts this extra time by going to state 414 which sends the HOLDOFF_L signal 154 to block the XMIT ENA signal 152 in AND circuit 120, thus removing the ENA signal 156 from the XMIT CONV circuit 112 for one cycle of the state machine.

The state machine then goes back to the IDLE state 402 to wait for another byte of data to be placed in the XMIT FIFO 108. Thus the loopback control circuit 106 sends data from the transmitter side of the interface to the receiver side of the interface while using the circuits in the same manner as normal operation, to completely test the circuits.

Figure 5:
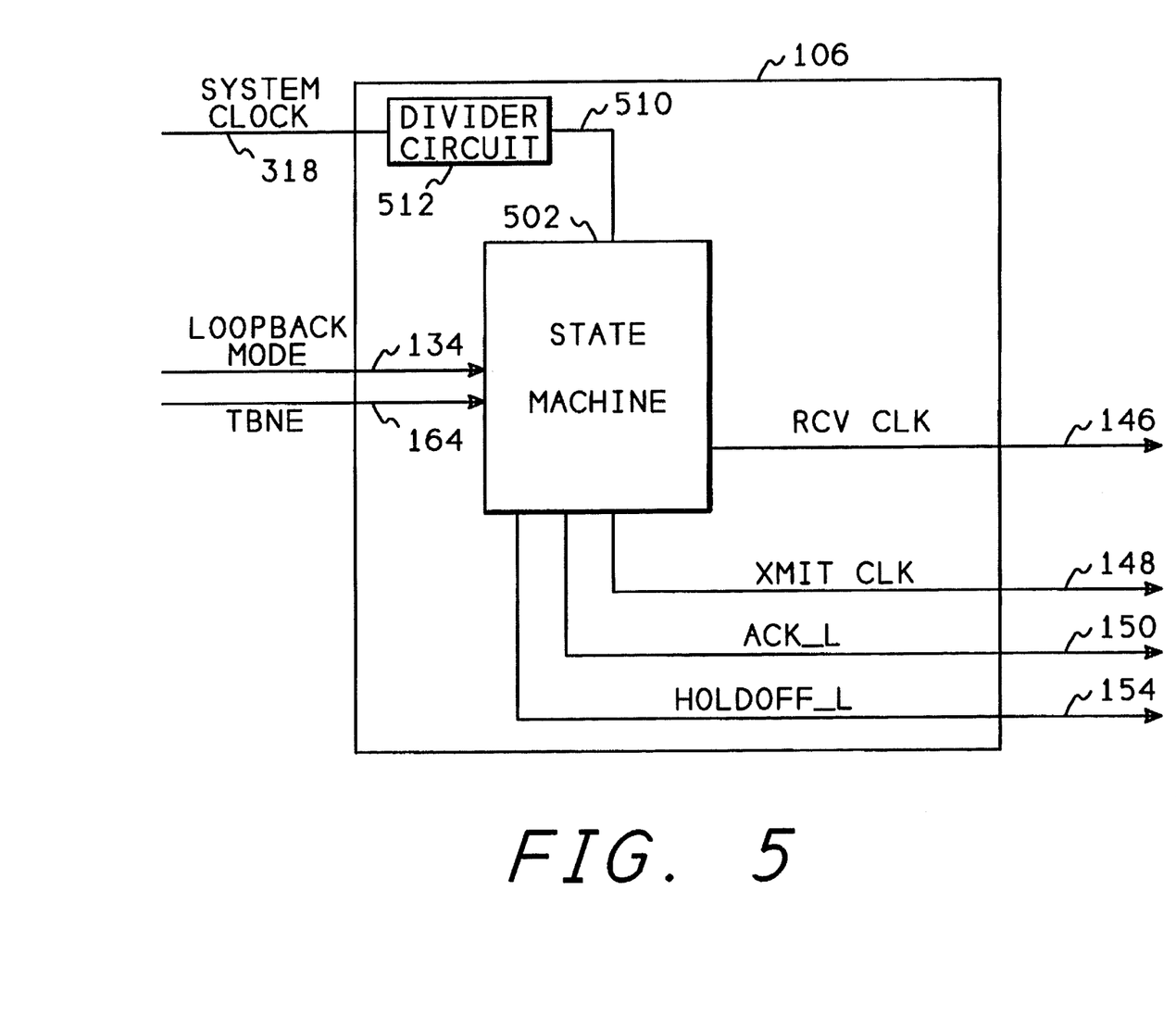
FIGS. 5 and 6 show an alternative, preferred, embodiment of the loopback control circuit and state machine diagram.
Figure 6:
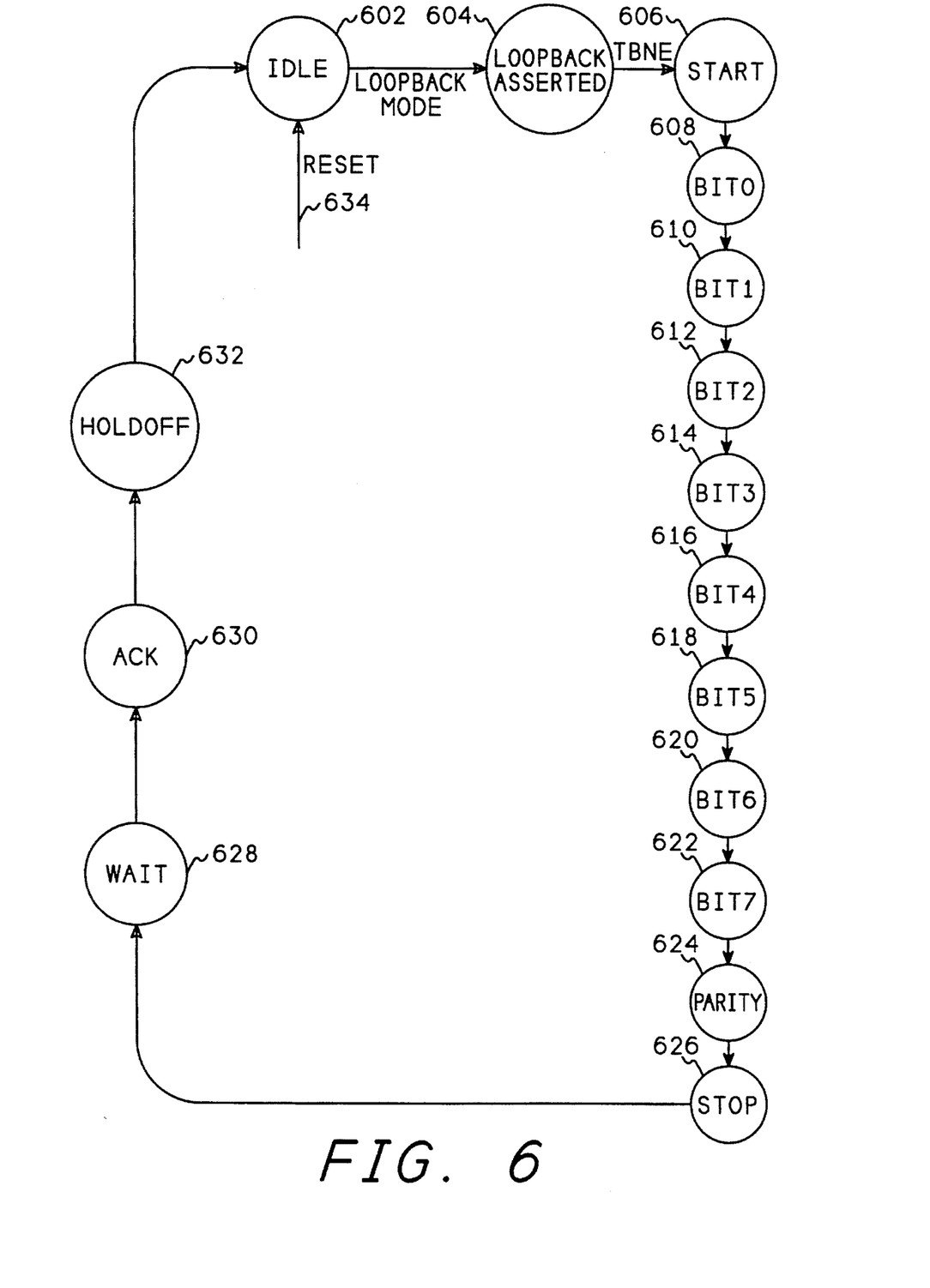

FIGS. 5 and 6 shows an alternative, preferred embodiment, state machine and state machine diagram for the loopback control circuit of FIG. 1. In the circuit of FIGS. 5 and 6, the state machine circuit does not use the counter circuit 304, nor does it need the delay 308 that were required in the circuit of FIG. 3. The additional states take the place of the counter 304, and the delay is accomplished by the state machine outputting an inverted XMIT CLK signal 148 as the RCV CLK signal 146. Since the RCV CLK signal 146 is inverted from the XMIT CLK signal 148, the rising edge of the RCV CLK signal will be delayed by one-half the clock period from the rising edge of the XMIT CLK signal, thus accomplishing the delay required to avoid a race condition.

Referring to FIGS. 5 and 6, the LOOPBACK CONTROL circuit 106 contains a STATE MACHINE 502, that controls the operation of the LOOPBACK CONTROL circuit. The STATE MACHINE 502 will be described below with respect to FIG. 6. The STATE MACHINE 502 is clocked by a clock signal 508 which is derrived by dividing the system clock 318 by a fixed value, using the divider circuit 512, in the manner described above for divider circuit 322.

FIG. 6 shows a state diagram of the STATE MACHINE 502 of FIG. 5. This state machine is only used when the interface is placed in loopback mode by setting the LOOPBACK MODE bit in the CTRL REG 204 (FIG. 2). Referring now to FIG. 6, the state machine normally waits in the IDLE state 602 as long as the LOOPBACK MODE bit is inactive. Also, as shown by reset line 634, if a reset occurs in any state, the state machine will return to the idle state 602.

Once the LOOPBACK MODE bit is set, as indicated by LOOPBACK MODE signal 134, the state machine moves to LOOPBACK ASSERTED state 604. When a byte of data is stored in the XMIT FIFO 108 causing the TBNE signal to be set, the state machine moves to START state 606, which outputs the RCV CLK signal 146 (FIG. 5) to the RCVR CONV circuit 110. The RCV CLK signal will indicate to the RCVR CONV circuit 110 that a start bit is present on the DATA IN signal 136. The start bit will be present on the DATA IN signal 136 at this time because the TBNE signal 164 caused the byte of data in the XMIT FIFO to be loaded into the XMIT CONV circuit 112, and the XMIT CONV circuit placed the start bit on the DATA OUT signal 138, which is connected to the DATA IN signal 136 through circuit 122 and the multiplexer 114.

After START state 606 sends the RCV CLK signal 146, the state machine goes to BIT0 state 608 sends the XMIT CLK signal 148, and also sends the RCV CLK signal 146, to clock bit zero out of the XMIT CONV circuit 112 and into the RCVR CONV circuit 110. The state machine then goes to BIT1 state 610 which clocks bit 1 from the XMIT CONV circuit to the RCVR CONV circuit, and then to BIT2 state 612 to clock bit 2, etc. After bit 7 has been clocked, the state machine goes to PARITY state 624 to clock the parity bit and then STOP state 626 clocks the stop bit into the RCVR CONV circuit. WAIT state 628 provides a one clock period delay.

Once the state machine reaches WAIT state 628, all bits of the byte have been sent, so the state machine goes to the ACK state 630 to send the ACK_L signal 150. This signal causes signal 158 to be pulled low, thus indicating to the XMIT CONV circuit 110 that the last data bit has been received. The normal signal level on the ACK_L signal is high, thus allowing all data from the DATA OUT signal to pass through AND circuit 122, but in the ACK_L state 412, the ACK_L signal is set to a low value, degating AND circuit 122 and causing signal 158 to go low. Pulling the DATA IN signal low is the same method used by the external device to indicate that a byte of data has been received by the external device, thus the loopback circuit works in the same manner as the external device.

The external device will not allow the transmitter to send another byte until it has processed the current byte. This is indicated to the transmitter by the external device holding the data line low until the external device is ready to receive another byte. This means that the XMIT CONV circuit needs an extra time between sending bytes of data. The loopback circuit inserts this extra time by going to HOLDOFF state 632 which sends the HOLDOFF_L signal 154 to block the XMIT ENA signal 152 in AND circuit 120, thus removing the ENA signal 156 from the XMIT CONV circuit 112 for one cycle of the state machine.

The state machine then goes back to the IDLE state 602 and if the loopback mode bit is still set, the state machine goes to LOOPBACK ASSERTED state 604 to wait for another byte of data to be placed in the XMIT FIFO 108. Thus the loopback control circuit 106 sends data from the transmitter side of the interface to the receiver side of the interface while using the circuits in the same manner as normal operation, to completely test the circuits.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A serial interface circuit for connecting a computer system to a serial device, wherein bytes of data are transferred in two directions between said computer system and said serial device using a single data signal and further wherein said data transfer is controlled by a single clock signal, said serial interface circuit comprising:

a transmitter circuit connected between said computer system and said serial device for sending data from said computer system to said serial device using said single data signal and said single clock signal;

a receiver circuit connected between said serial device and said computer system for receiving data sent by said device into said computer system using said single data signal and said single clock signal; and a loopback circuit connected between said transmitter circuit, said receiver circuit, said single data signal, and said single clock signal to interrupt said data signal and said clock signal and to control said data signal and said clock signal to transfer data between said transmitter circuit and said receiver circuit, and wherein said loopback circuit further comprises a circuit connected to said single data signal to send an additional bit of data after each byte is sent from said transmitter circuit to said receiver circuit, wherein said additional bit of data has a predetermined value.

2. The interface circuit of claim 1 wherein said loopback circuit further comprises means for providing a clock signal to said receiver circuit delayed from a clock signal provided to said transmitter circuit.

3. The interface circuit of claim 1 wherein said predetermined value is zero.

4. The interface circuit of claim 1 wherein said loopback circuit further comprises means for delaying said transmitter circuit a predetermined amount of time after each byte is sent from said transmitter circuit to said receiver circuit.

5. The interface circuit of claim 1 wherein said loopback circuit transfers data between said transmitter circuit and said receiver circuit at a rate different from a rate used to transmit and receive data from said serial device.

6. The interface circuit of claim 1 wherein a clock signal connected to said loopback circuit has a lower frequency than a clock signal connected to other circuits within said interface circuit.

7. A serial interface circuit for connecting a computer system to a serial device, wherein bytes of data are transferred in two directions between said computer system and said serial device using a single data signal and further wherein said data transfer is controlled by a single clock signal, said serial interface circuit comprising:

transmitter means connected between said computer system and said serial device for sending data from said computer system to said serial device using said single data signal and said single clock signal;

receiver means connected between said serial device and said computer system for receiving data sent by said device into said computer system using said single data signal and said single clock signal;

loopback means connected between said transmitter circuit, said receiver circuit, said single data signal, and said single clock signal to interrupt said data signal and said clock signal and to control said data signal and said clock signal to transfer data between said transmitter circuit and said receiver circuit, wherein said loopback means transfers data between said transmitter means and said receiver means at a rate different from a rate used to transmit and receive data from said serial device.

8. The interface of claim 7 wherein said loopback means further comprises a delay means connected between said clock signal and said receiver means, wherein said clock signal connected to said receiver means is delayed from said clock signal connected to said transmitter means.

9. The interface of claim 7 wherein said loopback means further comprises a means connected to said single data to send an additional bit of data after each byte is sent from said transmitter means to said receiver means, wherein said additional bit of data has a predetermined value.

10. The interface of claim 9 wherein said predetermined value is zero.

11. The interface of claim 7 wherein said loopback means further comprises a delay means for delaying said transmitter means a predetermined amount of time after each byte is sent from said transmitter means to said receiver means.

12. The interface circuit of claim 7 wherein a clock signal connected to said loopback means has a lower frequency than a clock signal connected to said transmitter means and said receiver means.

* * * * *

UNITED STATES PATENT AND TRADEMARK OFFICE
CERTIFICATE OF CORRECTION

PATENT NO. : 5,586,123
DATED : December 17, 1996
INVENTOR(S) : Thomas H. Baker It is certified that error appears in the above-identified patent and that said Letters Patent is hereby corrected as shown below:

Column 10,
Line 2, after "data" insert -- signal --

Signed and Sealed this

Eighteenth Day of March, 2003

JAMES E. ROGAN
*Director of the United States Patent and Trademark Office*